United States Patent [19]

Overby, III

[11] 4,308,603
[45] Dec. 29, 1981

[54] FERROFLUID TRANSDUCER

[75] Inventor: James W. Overby, III, Palm Bay, Fla.

[73] Assignee: The United States of America as represented by the Secretary of the Navy, Washington, D.C.

[21] Appl. No.: 95,112

[22] Filed: Nov. 16, 1979

[51] Int. Cl.$^3$ ............................................. H04R 15/00
[52] U.S. Cl. ..................................... 367/141; 367/168; 310/26
[58] Field of Search ............... 367/141, 156, 168, 166, 367/171; 310/26; 252/62.51, 62.52, 62.53, 62.56

[56] References Cited

U.S. PATENT DOCUMENTS

| | | | |
|---|---|---|---|
| 2,984,819 | 5/1961 | Miller | 367/168 |
| 3,371,309 | 2/1968 | Rich | 367/141 |
| 3,917,538 | 11/1975 | Rosensweig | 252/62.51 |

OTHER PUBLICATIONS

"Magnetic Properties of Stable Dispersions of Sub-domain Magnetite Particles", by Kaiser et al., Journal of App. Physics, vol. 41, No. 3, Mar. 1, 1970.

Primary Examiner—Harold J. Tudor
Attorney, Agent, or Firm—R. S. Sciascia; William T. Ellis; Melvin L. Crane

[57] ABSTRACT

A magnetic fluid transducer for producing a low-frequency sound field in a fluid medium. The device comprises a non-magnetic cylindrical housing with end windows. The housing is surrounded by a magnetic-field-generator means and contains a magnetic fluid within the housing. The magnetic field penetrates the housing and interacts with the magnetic fluid. A body force is developed within the fluid which produces an internal pressure in local regions defined by the lines of magnetic flux. This internal pressure is transmitted by an acoustic transmitting medium to the surrounding fluid as a sound pressure level.

6 Claims, 2 Drawing Figures

FERROFLUID TRANSDUCER

BACKGROUND OF THE INVENTION

This invention relates to underwater sound producing means and more particularly to means for producing low frequency sound waves.

Many years of research have been spent in a search for more efficient sonar equipment. Basically sonar equipment has been limited to magnetostrictive and piezoelectric types. These have been used as single transducer elements and in arrays for transmitting and receiving underwater sound waves. Better and more sophisticated equipment, including computers and accurate timing devices, has aided in improving underwater devices for detecting underwater signals. These detection devices encounter many problems in detection of low frequencies. Low frequencies imply longer wavelengths and longer wavelengths require larger transducers to produce them. Piezoelectric devices are brittle and their physical properties preclude their use because of the extended motion required to produce low frequencies.

Magnetostrictive materials operate low efficiency requiring large bulky devices which are impractical.

SUMMARY OF THE INVENTION

An underwater sound source comprising a ferrofluid contained within a housing and activated by a surrounding solenoid. The solenoid creates a magnetic field which aligns the particles within the ferrofluid. The aligned particles act upon one end of the housing to produce a low frequency sound wave through interaction within which the device is placed.

DETAILED DESCRIPTION

Figure 1:
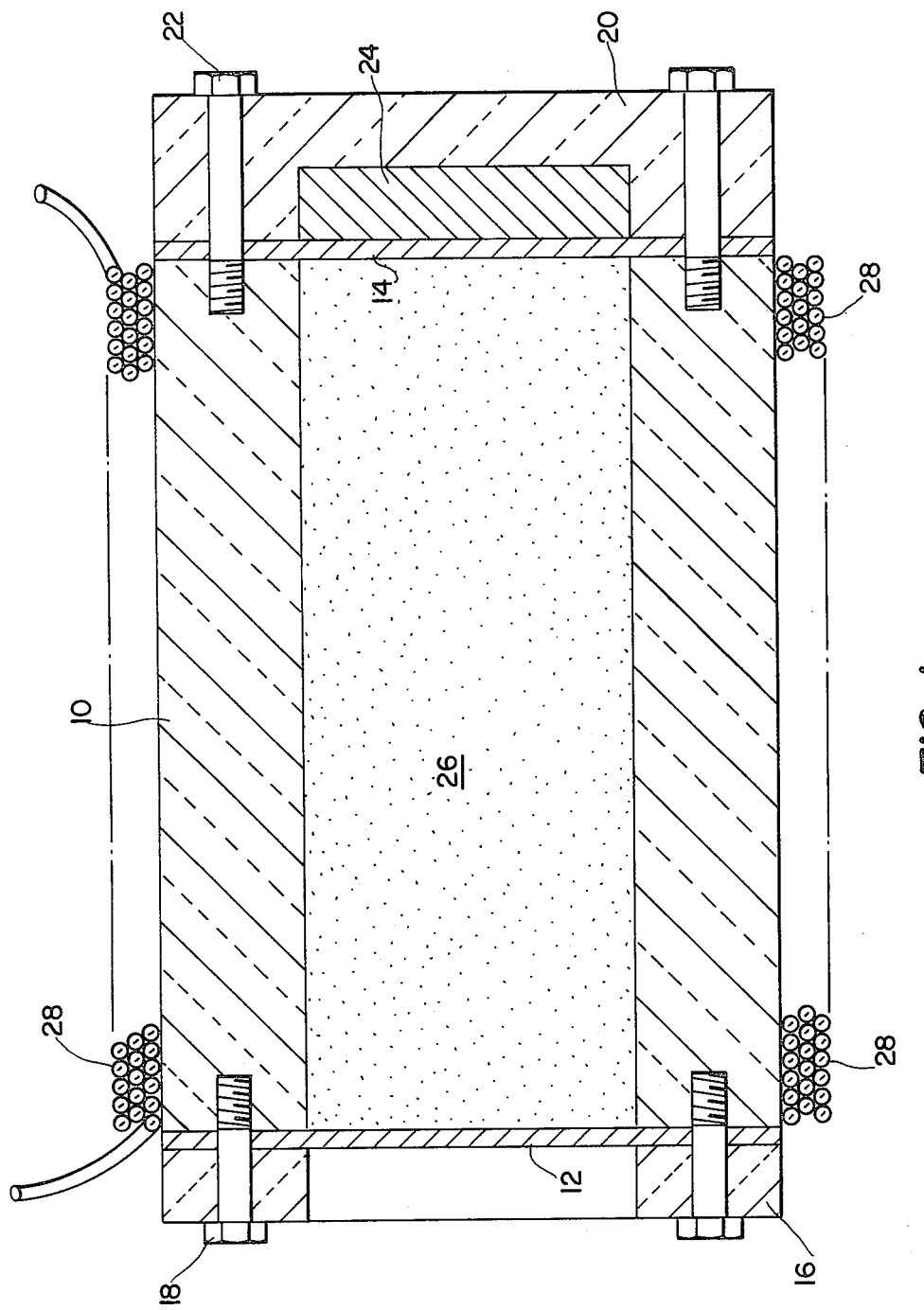
FIG. 1 is a cross-sectional view of the device.

As shown in FIG. 1, the transducer includes a cylindrical housing 10 made of any suitable non-magnetic material such as polycarbonate. The cylindrical housing is enclosed on each end by acoustic transmitting material windows 12 and 14 such as made for example, from a plastic sheet such as SARAN WRAP (a vinyl chloride-vinylidene chloride copolymer) bonded to a natural rubber such as Rho-C. Window 12 is held in place by a ring 16 having the same inner and outer dimensions as the cylindrical housing and suitable bolts 18 threaded into the end of housing. The window 14 is held in place by a plate 20 through which bolts 22 thread into the end of the housing. The plate 20 is cut out over a portion equal to the inner diameter of the housing to provide a space between the end window 14 and the end plate 20. The space between the end window 14 and end plate 20 is filled with a sound-wave decoupling material 24 such as air so that no acoustical waves pass through the plate covered end. The plate 20 may be of the same material as that of the cylindrical housing.

The open central area of the housing confined between the end windows 12 and 14 is filled with a FERROFLUID 26. A ferrofluid is a colloidal of iron particles, sized in a 100 Å range, with an Oleic acid used as a dispersing agent. FERROFLUID is a tradename by Ferrofluidics Corporation, 144 Middlesex Turnpike, Burlington, Mass. The mixture is homogeneous ferromagnetic material which retains all its fluid characteristics.

The cylindrical housing is surrounded by a highinductance coil of wire 28 (63 Henries at 120 Hz) formed by 18,000 turns of number 24 solid copper wire with a double coat of high-temperature varnish-type insulation. The coil of wire forms a magnetic field generator which generates axial magnetic field lines in the FERROFLUID in the housing. When a magnetic field is applied to the fluid, a body force is developed by the magnetic particles within the fluid which is sufficient to radically change the fluid's gross behavior without altering its fluid characteristics.

Figure 2:
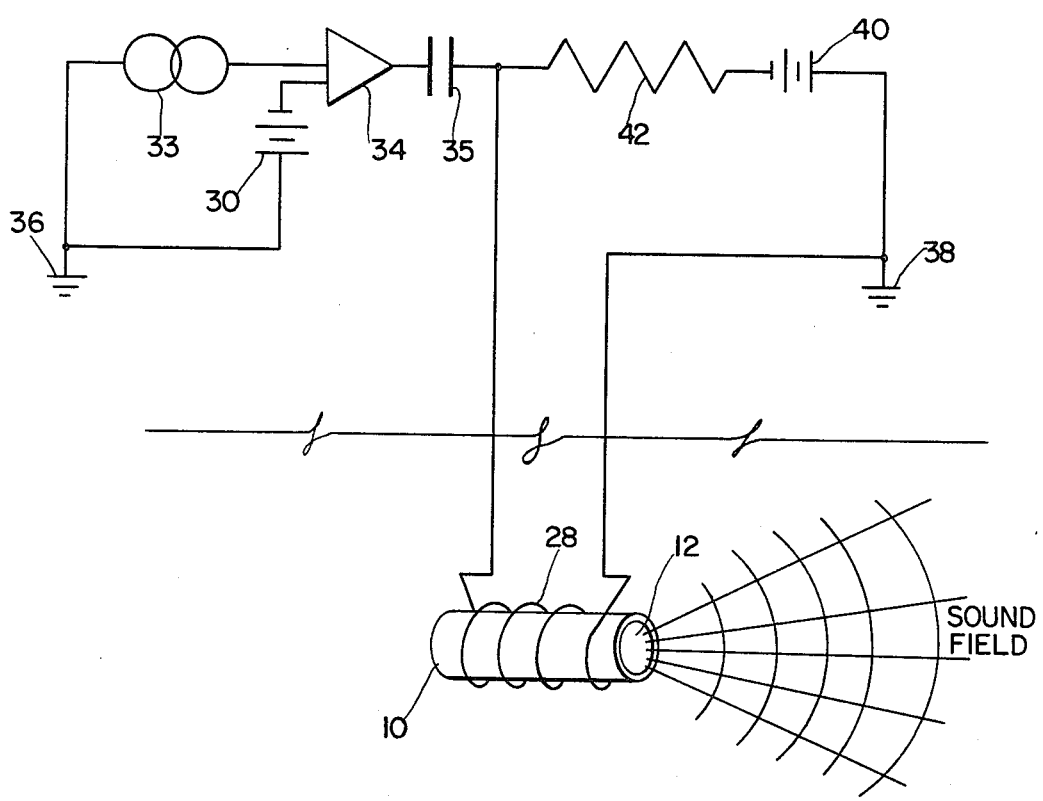
FIG. 2 is a schematic drawing including the electrical circuitry.

As shown in FIG. 2, the coil 28 is connected with an ac signal-generator circuit to produce a magnetic field. The signal generator circuit includes a dc power supply 30 and a signal generator 33 which generates an ac voltage that is amplified by an ac signal amplifier 34 and conducted to a blocking capacitor 35. The circuit is grounded at 36. The signal is directed from the blocking capacitor to the coil 28 and grounded at 38. It is desired that the underwater sound source be linear or consistently reproduce sounds of the same intensity for the same amount of ac drive signal regardless of the frequency of the ac signal. Therefore, a small dc bias signal is applied to the magnetic fluid by a dc power supply 40 and a blocking resistor 42 in the ac signal-coil input circuit. In operation, an ac voltage is generated in the electrical circuitry and is passed through the coil 28 to generate a changing magnetic field. The magnetic field penetrates the housing and produces an axially aligned spatially varying magnetic field. The magnetic field reacts with the particles in the fluid to rotate and align the particles with the magnetic field lines. A body force is developed within the fluid which augments the internal pressure in local regions defined by the lines of magnetic flux. This internal pressure is transmitted by the fluid transmitting medium within the housing to the end window which reacts against the surrounding medium thereby producing sound pressure waves. As the ac signal generator alternates, so does the pressure on the fluid within the housing to produce the outgoing sound waves. Ferrohydrodynamic interactions require the existence of a spatially varying magnetic field because the magnitude of the filed, either static or dynamic, is not the element which controls the amount of body force but rather the strength of the body force developed in the ferrofluid is proportional to the magnetic field gradient.

Since one end of the housing contains a decoupling material, the acoustic device is a monopole radiator.

As an example, the cylindrical housing may have a length of 4 inches and an internal diameter of 2.5 inches. The thickness of the housing need be only thick enough to operate in the intended surrounding medium. Since the window is flexible, the pressure on the inside will equal the pressure on the outside. The magnetic fluid transducer can generate appreciable sound levels using highinductance coils, thus requiring relatively small amounts of current compared to prior-art mechanism designs. The device is not a resonant device and is constructed to be frequency-independent over large ranges to provide a broad bandwidth device. This is accomplished by the application of a small dc bias signal to the magnetic fluid. Since the inner confines of the transducer contain a fluid compatible with water, pressure compensation is not necessary and energy losses due the coupling interface are minimal.

Obviously many modifications and variations of the present invention are possible in light of the above teachings. It is therefore to be understood that within the scope of the appended claims the invention may be practiced otherwise than as specifically described.

I claim:

1. A device for producing low-frequency underwater acoustic sound waves comprising:

a cylindrical housing of a material transparent to magnetic field lines;

first and second window means enclosing opposite ends of the cylindrical housing and defining acoustic sound wave transmitting mediums;

a ferromagnetic fluid confined between the first and second window means and completely filling the cylindrical housing;

said first window means adapted for interfacing with water on its outside surface;

means outwardly adjacent the second window means for decoupling acoustic sound waves having been transmitted through the second window means;

magnetic field producing means surrounding the cylindrical housing and adapted for producing magnetic field lines axially within the housing;

whereby, upon energization of the magnetic field producing means, the magnetic field lines within the housing causes a change in behavior of the ferromagnetic fluid for generating acoustic sound waves therein which are transmitted through the first window means to water interfacing with its outside surface.

2. The invention according to claim 1 wherein the magnetic field producing means includes a coil of wire surrounding the housing.

3. The invention according to claim 1 or 2 further defined by means including an ac signal generator for activating the magnetic field producing means.

4. The invention according to claim 3 further defined by a dc bias producing means connected to the coil whereby sound waves of the same intensity are produced regardless of the frequency of the ac signal.

5. The invention according to claim 1 further defined by the ferromagnetic fluid including a kerosene based colloiod and iron particles with oleic acid as a dispersing agent.

6. A device for producing low frequency acoustic waves for underwater transmission comprising:

a non-magnetic housing enclosing an axially disposed chamber filled with a ferromagnetic fluid including magnetic particles suspended in a colloid;

window means at one axial extremity of the housing defining an acoustic transmitting medium for interfacing with the ferromagnetic fluid at its inner surface and with water at its outer surface;

means at the other axial extremity of the housing for absorbing acoustic waves transmitted thereto; and, means outside the housing for producing ac magnetic field lines axially within the housing for causing realignment of magnetic particles in the ferromagnetic fluid for generating acoustic waves which are transmitted through the window means for underwater transmission.

* * * * *